(12) United States Patent
Liu et al.

(10) Patent No.: US 11,821,999 B2
(45) Date of Patent: Nov. 21, 2023

(54) ATTITUDE DETERMINATION BASED ON GLOBAL NAVIGATION SATELLITE SYSTEM INFORMATION

(71) Applicant: KING ABDULLAH UNIVERSITY OF SCIENCE AND TECHNOLOGY, Thuwal (SA)

(72) Inventors: Xing Liu, Thuwal (SA); Tarig Ballal Khidir Ahmed, Thuwal (SA); Tareq Y. Al-Naffouri, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 269 days.

(21) Appl. No.: 17/269,390

(22) PCT Filed: Apr. 4, 2019

(86) PCT No.: PCT/IB2019/052785
§ 371 (c)(1),
(2) Date: Feb. 18, 2021

(87) PCT Pub. No.: WO2020/044129
PCT Pub. Date: Mar. 5, 2020

(65) Prior Publication Data
US 2021/0396890 A1    Dec. 23, 2021

Related U.S. Application Data

(60) Provisional application No. 62/724,815, filed on Aug. 30, 2018.

(51) Int. Cl.
*G01S 19/39* (2010.01)
*G01S 19/55* (2010.01)
(Continued)

(52) U.S. Cl.
CPC ............ *G01S 19/55* (2013.01); *G01S 19/396* (2019.08); *G01S 19/40* (2013.01); *G01S 19/50* (2013.01)

(58) Field of Classification Search
None
See application file for complete search history.

(56) References Cited

U.S. PATENT DOCUMENTS

2021/0190971 A1*  6/2021  Vasilyuk ............. G01C 21/165

OTHER PUBLICATIONS

T. Ballal and C. J. Bleakley, "GNSS instantaneous ambiguity resolution and attitude determination exploiting the receiver antenna configuration," in IEEE Transactions on Aerospace and Electronic Systems, vol. 50, No. 3, pp. 2061-2069, Jul. 2014, doi: 10.1109/TAES.2014.120120. (Year: 2014).*

(Continued)

*Primary Examiner* — Timothy A Brainard
*Assistant Examiner* — Hailey R Le
(74) *Attorney, Agent, or Firm* — PATENT PORTFOLIO BUILDERS PLLC

(57) ABSTRACT

A method for determining a 3-dimensional (3D) attitude of a platform includes receiving satellite relayed information regarding an ambiguous phase single-difference measurement ($\varphi$); resolving a phase ambiguity of the ambiguous phase single-difference measurement ($\varphi$) to determine an unambiguous phase single-difference estimate ($\phi$); calculating coarse direction vectors $x_{cor}$ and $y_{cor}$ based on the unambiguous phase single-difference estimate ($\phi$); estimating improved direction vectors x and y based on the coarse direction vectors $x_{cor}$ and $y_{cor}$ and by imposing constraints on the improved direction vectors x and y and an angle between the improved direction vectors x and y; and calculating the 3D attitude of the platform from the improved direction vectors x and y.

21 Claims, 7 Drawing Sheets

(51) Int. Cl.
*G01S 19/40* (2010.01)
*G01S 19/50* (2010.01)

(56) References Cited

OTHER PUBLICATIONS

Peter J. Buist, Peter J. G. Teunissen, Gabriele Giorgi, Sandra Verhagen, "Multiplatform Instantaneous GNSS Ambiguity Resolution for Triple- and Quadruple-Antenna Configurations with Constraints", International Journal of Navigation and Observation, vol. 2009, Article ID 565426, 14 pages, 2009. (Year: 2009).*
Ballal, T., et al., "DOA Estimation for a Multi-Frequency Signal Using Widely-Spaced Sensors," 18th European Signal Processign Conference (EUSIPCO-2010), Aalborg, Denmark, Aug. 23-27, 2010, pp. 691-695.
Ballal, T., et al., "GNSS Instantaneous Ambiguity Resolution and Attitude Determination Exploiting the Receiver Antenna Configuration," IEEE Transactions on Aerospace and Electronic Systems, Jul. 2014, vol. 50, No. 3, pp. 2061-2069, IEEE.
Ballal, T., et al., "Phase-Difference Ambiguity Resolution for a Single-Frequency Signal in the Near-Field Using a Receiver Triplet," IEEE Transactions on Signal Processing, Nov. 2010, vol. 58, No. 11, pp. 5920-5926.
Ballal, T., et al., "Phase-Difference Ambiguity Resolution for a Single-Frequency Signal," IEEE Signal Processing Letters, Dec. 2008, vol. 15, pp. 853-856.
Buist, P.J., et al., "Multiplatform Instantaneous GNSS Ambiguity Resolution for Triple- and Quadruple-Antenna Configurations with Constraints," International Journal of Navigation and Observation, Nov. 8, 2009, vol. 2009, Article ID 565426, 14 pages.
El-Mowafy, A., et al., "Epoch-by-Epoch Ambiguity Resolution for Real-Time Attitude Determination Using a GPS Multiantenna System," Navigation: Journal of The Institute of Navigation, Sep. 1, 1995, vol. 42, No. 2, pp. 392-408.
Hill, C.D., et al., "An Optimal Ambiguity Resolution Technique for Attitude Determination," Position Location and Navigation Symposium, 1996, IEEE 1996, Atlanta, GA, Apr. 22, 1996, pp. 262-269.
International Search Report in corresponding/related International Application No. PCT/IB2021/052785, dated Sep. 27, 2019.
Liu, et al., "Dual Frequency Long-Short Baseline Ambiguity Resolution for GNSS Attitude Determination," Plans 2016—Proceedings of IEEE/ION Plans 2016, The Institute of Navigation, Apr. 14, 2016, pp. 630-637.
Purivigraipong, S., et al., "Resolving Integer Ambiguity of GPS Carrier Phase Difference," IEEE Transactions on Aerospace and Electronic Systems, Apr. 2010, vol. 46, No. 2, pp. 832-847.
Teunissen, P.J.G., "The Lease-Squares Ambiguity Decorrelation Adjustment: A Method for Fast GPS Integer Ambiguity Estimation," Journal of Geodesy, Nov. 1995, vol. 70, pp. 65-82, Springer-Verlag 1995.
Written Opinion of the International Searching Authority in corresponding/related International Application No. PCT/IB2021/052785, dated Sep. 27, 2019.
Substantive Examination Report in corresponding/related Saudi Arabian Application No. 521421333, dated Sep. 19, 2023.

* cited by examiner

ATTITUDE DETERMINATION BASED ON GLOBAL NAVIGATION SATELLITE SYSTEM INFORMATION

CROSS-REFERENCE TO RELATED APPLICATIONS

This application is a U.S. National Stage of International Application No. PCT/IB2019/052785, filed Apr. 4, 2019, which claims priority to U.S. Provisional Patent Application No. 62/724,815, filed on Aug. 30, 2018, entitled "ROBUST AND ACCURATE METHODS FOR GNSS ATTITUDE DETERMINATION," the disclosures of which are incorporated herein by reference in their entirety.

BACKGROUND

Technical Field

Embodiments of the subject matter disclosed herein generally relate to applications of the Global Navigation Satellite System (GNSS), and more specifically, to determining an attitude of an object based on GNSS information.

Discussion of the Background

Attitude determination is an important application of Global Navigation Satellite Systems (GNSS). However, carrier phase integer ambiguity is a major difficulty for achieving GNSS-based attitude determination. The goal of attitude determination is to estimate the 3-D orientation of a body frame geometry of a vehicle relative to a fixed reference frame. Vehicle attitude determination based on GNSS is an important alternative to the traditional methods that use different sensing equipment (such as gyroscopes or star-trackers) of inertial navigation systems. GNSS attitude determination, which estimates attitude by employing multiple GNSS antennas firmly mounted on the vehicle, has been widely used in different navigation, guidance and vehicle control systems.

Carrier phase observations, whose noise is two orders of magnitude lower than pseudo-range measurements of GNSS, are utilized to provide 3-D vehicle attitude with high accuracy. One challenge in GNSS attitude determination is the phase ambiguity problem, i.e., the fact that only the fractional part of the carrier phase is detected so that the carrier phase observables are ambiguous by an unknown number of whole cycles. The resolution of the carrier phase ambiguity is an active research area with many methods being proposed throughout the years.

Generally, most of these methods can be divided into two different categories: motion-based methods and search-based methods. Motion-based methods take advantage of the dynamic information of the satellite-receiver geometry to resolve the unknown integer ambiguities. For this kind of methods, GNSS observations over multiple epochs are utilized. Consequently, these methods are not applicable when instantaneous attitude information is required.

Search-based methods resolve carrier phase integer ambiguities through searching in a different domain using different search strategies [1][2]. These methods can be utilized for real-time ambiguity resolution since the relative motion between satellite and receiver is not required in these methods.

GNSS observations can be processed using single-differencing, double-differencing and triple-differencing models. Single-differencing is capable of eliminating the satellite clock bias and reduce many other errors. However, the receiver clock bias, which could have a magnitude of milliseconds, still remains unaccounted for. To compensate for the receiver clock bias, single-differencing can be used along with common receiver clock technology such that the single-differencing operation cancels both the satellite and receiver clock bias. Double-differencing models can eliminate or significantly reduce both the satellite and receiver clock biases, instruments delays, atmospheric parameters, and multipath errors. The purpose of triple-differencing is to cancel the integer ambiguity when it remains unchanged within two successive epochs.

However, the existing methods still suffer from inaccuracies and use complex mathematical algorithms that require intensive computational configurations. Thus, there is a need to provide an improved method and system that determine the attitude of a body based on GNSS information.

SUMMARY

According to an embodiment, there is a method for determining a 3-dimensional (3D) attitude of a platform. The method includes receiving satellite relayed information regarding an ambiguous phase single-difference measurement ($\varphi$); resolving a phase ambiguity of the ambiguous phase single-difference measurement ($\varphi$) to determine an unambiguous phase single-difference estimate ($\phi$); calculating coarse direction vectors $x_{cor}$ and $y_{cor}$ based on the unambiguous phase single-difference estimate ($\phi$); estimating improved direction vectors x and y based on the coarse direction vectors $x_{cor}$ and $y_{cor}$ and by imposing constraints on the improved direction vectors x and y and an angle between the improved direction vectors x and y; and calculating the 3D attitude of the platform from the improved direction vectors x and y.

According to another embodiment, there is a system for determining a 3-dimensional (3D) attitude of a platform. The system includes plural receivers configured to receive satellite relayed information regarding an ambiguous phase single-difference measurement ($\varphi$); and a controller connected to the plural receivers and configured to, resolve a phase ambiguity of the ambiguous phase single-difference measurement ($\varphi$) to determine an unambiguous phase single-difference estimate ($\phi$); calculate coarse direction vectors $x_{cor}$ and $y_{cor}$ based on the unambiguous phase single-difference estimate ($\phi$), estimate improved direction vectors x and y based on the coarse direction vectors $x_{cor}$ and $y_{cor}$ and by imposing constraints on the improved direction vectors x and y and an angle between the improved direction vectors x and y; and calculate the 3D attitude of the platform from the improved direction vectors x and y.

According to still another embodiment, there is a non-transitory computer readable medium including computer executable instructions, wherein the instructions, when executed by a processor, implement instructions for determining a 3-dimensional (3D) attitude of a platform as discussed above.

According to an embodiment, there is a method for determining a 3-dimensional (3D) attitude of a platform. The method includes receiving satellite relayed information regarding (i) a double-difference pseudo-range measurement ($\rho$), and (ii) an ambiguous phase double-difference measurement ($\psi$); simultaneously and jointly searching for (1) direction vectors x and y associated with the platform, and (2) an unambiguous phase double-difference ($\phi$); and calculating the attitude of the platform based on the direction vectors x and y.

According to another embodiment, there is a system for determining a 3-dimensional (3D) attitude of a platform, the system including plural receivers configured to receive satellite relayed information regarding (i) a double-difference pseudo-range measurement ($\rho$), and (ii) an ambiguous phase double-difference measurement ($\psi$); and a controller connected to the plural receivers and configured to, simultaneously and jointly search for (1) direction vectors x and y associated with the platform, and (2) an unambiguous phase double-difference ($\phi$); and calculate the attitude of the platform based on the direction vectors x and y.

According to still another embodiment, there is a non-transitory computer readable medium including computer executable instructions, wherein the instructions, when executed by a processor, implement instructions for determining a 3-dimensional (3D) attitude of a platform according to the methods discussed herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
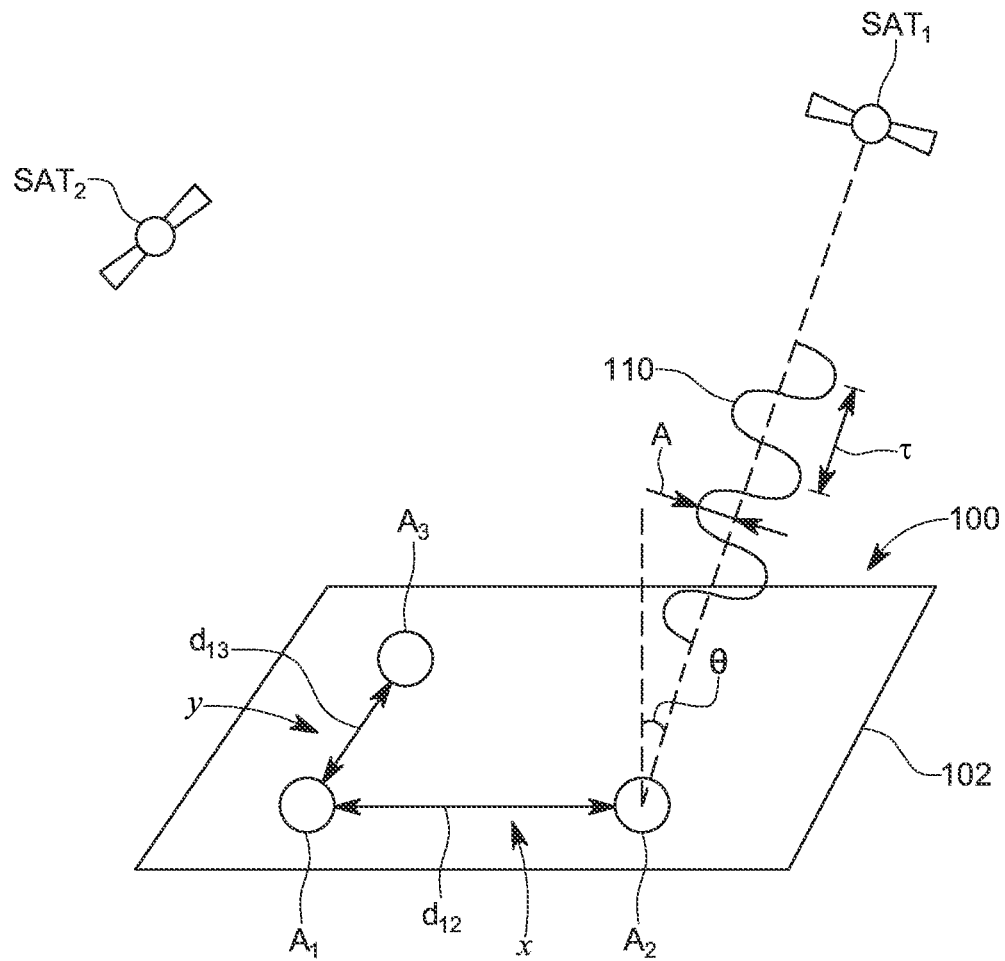
FIG. 1 illustrates a platform having three antennas that receive information from various satellites.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a vehicle that moves along a road. However, the embodiments discussed herein are applicable to a vehicle that may fly, move in the water or any other medium as long as satellite information is received for performing attitude calculations.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a moving platform equipped with multiple GNSS receivers. The carrier phase integer ambiguities of the information received from these receivers are resolved by utilizing the receiver configuration and/or one or more frequency measurements. For special receiver geometrical configurations to be discussed later, the ambiguity resolution problem is solved using an algebraic formula. In a different embodiment, when multiple GNSS frequency measurements are available, a similar method is developed under specific conditions to offer an alternative for solving the phase ambiguity problem. The methods presented in this application belong to the category of the search-based methods. This means that at least a pair of non-collinear antenna baselines are required for three dimensional (3-D) GNSS attitude determination, and the antenna geometrical information is known. Also, the relationship between different GNSS carrier frequencies is assumed to be known.

The novel ambiguity resolution methods exploit these geometrical and frequency information to obtain a fast and coarse solution to the ambiguity problem. After obtaining an initial solution, special procedures are applied to refine this solution to an acceptable level of success rate and attitude accuracy. In another embodiment, it is shown that more accurate and more reliable attitude estimations can be achieved by exploiting the prior knowledge of the antenna geometry or the relationship between the carrier frequencies available in the system.

As a common feature for the novel methods discussed herein, the 3-D attitude determination problem is tackled by estimating the pointing directions of two non-collinear, non-parallel, GNSS antenna baselines (which is sufficient to obtain the 3-D attitude). In these embodiments, the problem of estimating the pointing directions for such baselines is resolved. Having the pointing directions of the two baselines can then be used to determine the 3-D attitude of the platform. In some embodiments, the carrier phase ambiguities are resolved first and then coarse estimates of the pointing directions of the two baselines are independently determined. This process is simplified due to the underlying receiver antenna configuration or frequency information. The geometrical approach for ambiguity resolution relies on the availability of phase-difference information of a single GNSS frequency over a collinear antenna triplet, while the frequency based approach leverages the phase-difference information from two GNSS carrier frequencies observed across the baseline connecting a pair of antennas. Computationally tractable refining steps follow this stage to enhance the initial solution by leveraging available information to produce improved unwrapped phase difference estimates. Based on these improved phase differences, the 3-D attitude determination problem may be formulated as a least-squares problem with baseline lengths and baseline angle constraints, which is a non-convex optimization problem because of the coupling of variables due to baseline angle constraint. A novel search method is presented based on trigonometric functions to solve this non-convex optimization problem.

Before discussing the details of these novel methods, two integer ambiguity resolution methods are discussed for providing context to the invention. The integer ambiguity resolution and subsequent attitude determination are based exclusively herein on phase observables. In this regard, note that the GNSS includes plural geostationary satellites that are distributed around the earth and each one emits a corresponding electromagnetic signal or signals. Such a signal has an amplitude, phase, and frequency. As the phase changes between zero and $2\pi$ as the signal propagates, when the signal is received by a GNSS receiver (commercially available), the receiver can record the instant value of the phase, but not the number of times the phase has changed from zero to $2\pi$ prior to being recorded. Thus, if observations from plural satellites are available (assume that the number of available satellites is M), the carrier phase-difference observation equation for a single frequency can be formulated as:

$$\phi_{ij} = \varphi_{ij} + n_{ij} = d_{ij} Hx + \varepsilon, \tag{1}$$

where $\phi_{ij}$ is a vector of unambiguous phase single-difference between antennas i and j, with $\phi_{ij} \in \mathbb{R}^{M \times 1}$, $\varphi_{ij}$ is a vector of ambiguous phase single-difference observations between antennas i and j, with $\varphi_{ij} \in \mathbb{R}^{M \times 1}$, $n_{ij}$ is the unknown integer ambiguity vector, with $n_{ij} \in \mathbb{Z}^{M \times 1}$, $d_{ij}$ is the baseline length between two antennas, H is a matrix whose rows are the given satellite line-of-sight direction vectors, with $H \in \mathbb{R}^{M \times 3}$, x is the baseline pointing vector, with $x \in \mathbb{R}^{3 \times 1}$, and $\varepsilon$ is a vector that summarizes the contribution of different sources of errors, with $\varepsilon = \mathbb{R}^{M \times 1}$. Note that a parameter or constant or variable that is $\mathbb{R}^{3 \times 1}$ symbolizes a mathematical vector having three components, each component being a real number, and $\mathbb{R}^{M \times 3}$ indicates a matrix having M by 3 elements, each element being a real number.

The various quantities introduced above are illustrated in FIG. 1 for a better understanding of the observation model. System 100 has a platform 102 (for example, a vehicle, but it may be any object for which its attitude is desired to be known) that holds plural antennas. In this particular embodiment, there are three antennas A1, A2, and A3. Each antenna receives a signal from at least one satellite. In practice, each antenna receives plural signals from plural satellites Sat1, Sat2. The figure shows a single signal 110 that has a given amplitude A, a given wavelength $\lambda$ or frequency f, and a given phase. The $\phi_{ij}$ vector is calculated for any two antennas i and j, where i can be A1 and j can be A2, and this vector includes the full phase of the signal, from the satellite Sat1 to the platform 102. The vector $\varphi_{ij}$ is measured at the two antennas i and j and includes the ambiguous phase, i.e., only the phase difference between the two antennas i and j, but not the full phase from the satellite Sat1. The vector $n_{ij}$ includes the full phase contribution of the signal propagation from the satellite to the platform. The vector $d_{ij}$ includes the various distances between the antennas, for example, d12 and d13 in this specific embodiment. The baseline is called the line that connects one antenna to the other one. For example, there are two baselines x and y in FIG. 1, where x and y are the baseline pointing vectors. The incoming signal 110 makes an angle $\theta$ with a normal N to the platform (a normal is a line that is perpendicular to a surface of the platform).

For this observation model, all the quantities representing phase-difference or distance measurements are given in units of the wavelength of the carrier frequency. Note that this equation holds for other frequencies with different wavelengths. Two ambiguity resolution methods are now discussed. These methods are capable of solving the integer ambiguity of the phase.

Figure 2:
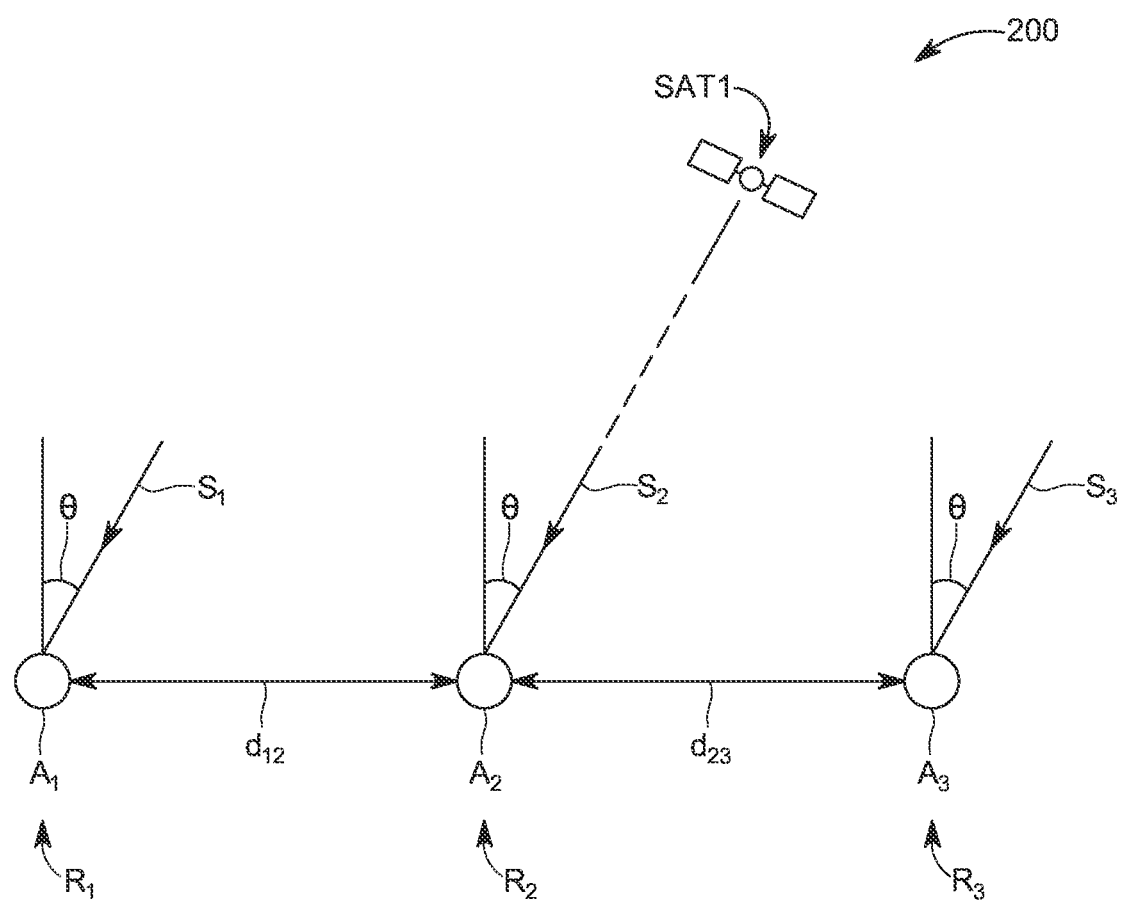
FIG. 2 illustrates a system that includes three antennas arranged along a single baseline and receiving a single frequency signal.

(I) Single Frequency Integer Ambiguity Resolution Using a Special Receiver Geometrical Configuration According to the first approach, an integer ambiguity resolution method similar to that described in [3], [4] and [5] is discussed. This method recovers the unknown integer ambiguities through a special antenna geometrical configuration, using single frequency observables. The antenna configuration is illustrated in FIG. 2 and includes a system 200 that has three receivers R1 to R3, each having its own antenna A1 to A3. Note that a receiver R includes an antenna A but also some processing elements, for example, a processor. Corresponding signals S1 to S3 are received by each receiver from a given satellite Sat1. For this antenna geometry, to simplify the integer ambiguity resolution, the baselines are required to satisfy the following condition:

$$\Delta_d \triangleq |d_{12} - d_{23}| \in (0, \tfrac{1}{2}). \tag{2}$$

This condition means that the shortest two baselines have to be of different lengths and the difference between the two baseline lengths is less than half of the wavelength of the received signal. This configuration can be utilized to perform ambiguity resolution for each individual satellite observations independently. Based on this antenna configuration, the unwrapped phase single-difference for the m-th satellite can be searched over a three-element set Sd given by:

$$S_d = \left\{ \phi_{12,m}(k_d) = \frac{d_{12}}{\Delta_d}(\varphi_{23,m} - \varphi_{12,m} + k_d) \,\middle|\, k_d = -1, 0, 1 \right\}. \tag{3}$$

Given the fact that only one element among this set falls in the interval $[-d_{12}, d_{12}]$ (4), the unique unwrapped phase is the candidate with the minimum absolute value, which according to [3] is:

$$\hat{\phi}_{12,m} = \phi_{12,m}(\hat{k}_d), \; \hat{k}_d = \underset{k_d}{\mathrm{argmin}} |\phi_{12,m}(k_d)|, \; k_d = -1, 0, 1. \tag{5}$$

In this equation, a vector or a parameter with a hat means that its value has been calculated, while the vector or parameter without the hat has been measured. To account for the presence of measurement noise, instead of using the above-estimated phase difference directly, the recovered phase difference may be refined using equations:

$$\hat{n}_{12,m} = \lfloor \hat{\phi}_{12,m} - \varphi_{12,m} \rceil, \tag{6}$$

$$\hat{\phi}_{12,m} = \varphi_{12,m} + \hat{n}_{12,m}, \tag{7}$$

where operation $\lfloor \; \rceil$ denotes the rounding operation. Details of the rounding operation and in general about this method can be found in [3] and [4].

(II) Dual Frequency Integer Ambiguity Resolution

Figure 3:
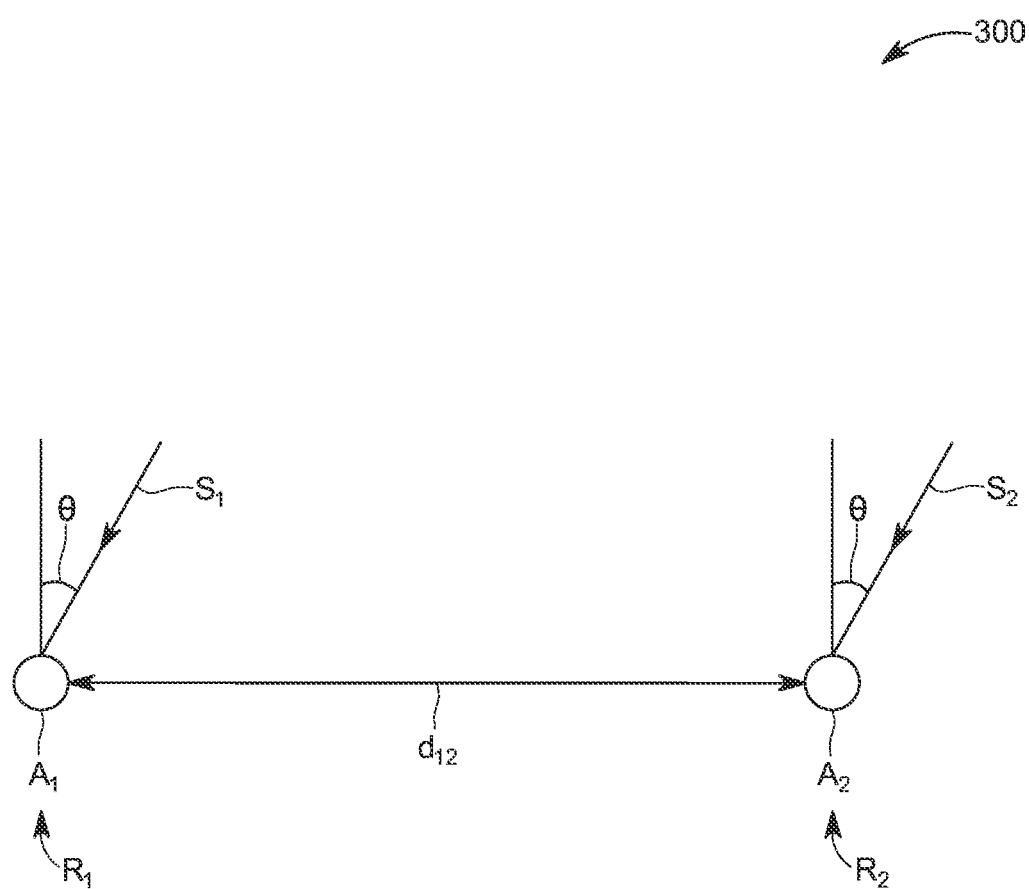
FIG. 3 illustrates a system that includes two antennas arranged along a single baseline and receiving two different frequency signals.

The previous method used a single frequency received from the satellite and three antennas arranged along a given line as illustrated in FIG. 2. However, it is possible to use two frequencies received from a given satellite, and only two antennas, as illustrated in FIG. 3. The present method for integer ambiguity resolution operates on the wrapped phase differences estimated at two different carrier frequencies $f_u$ and $f_v$. This method relies on the work described in [5], but it is adapted to GNSS attitude determination.

Considering two frequencies $f_u$ and $f_v$, and two spatially separated antennas A1 and A2 as shown in FIG. 3, the unwrapped phase difference can be estimated when the following criterion holds for the frequency difference and antenna separation:

$$\Delta_f \triangleq |f_u - f_v| \in \left(0, \frac{c}{2d_{12}}\right), \quad (8)$$

where c is the speed of light.

With this frequency constraint satisfied, for frequency $f_u$, the true phase difference estimate of the m-th satellite can be recovered from the three-candidate set:

$$S_f^u = \left\{ \phi_{12,m}^u(k_f) = \frac{f_u}{\Delta_f}(\varphi_{23,m}^u - \varphi_{12,m}^u + k_f) \mid k_f = -1, 0, 1 \right\}. \quad (9)$$

The true phase difference $\varphi_{12,m}^u$ is the only valid phase amongst the elements of the set $S_f^u$, with the validity of phase difference confirmed by the fact that the phase values fall in the interval $[-d_{12}, d_{12}]$ (10). In other words, the unwrapped phase is also the one that has the absolute minimum value in the set $S_f^u$. Therefore, it is possible to use the following operator to recover the unwrapped phase:

$$\hat{\phi}_{12,m}^u = \phi_{12,m}^u(\hat{k}_f), \hat{k}_f = arg_{k_f} \min |\phi_{12,m}^u(k_f)|, k_f = -1, 0, 1. \quad (11)$$

The recovered phase difference of equation (11) could be refined in order to reduce the influence of phase measurement noise. This can be achieved, for example, by the following operations:

$$\hat{n}_{12,m}^u = [\hat{\phi}_{12,m}^u - \varphi_{12,m}^u], \quad (12)$$

$$\hat{\phi}_{12,m}^u = \varphi_{12,m}^u + \hat{n}_{12,m}^u. \quad (13)$$

Coarse Direction Vector Determination

Figure 4:
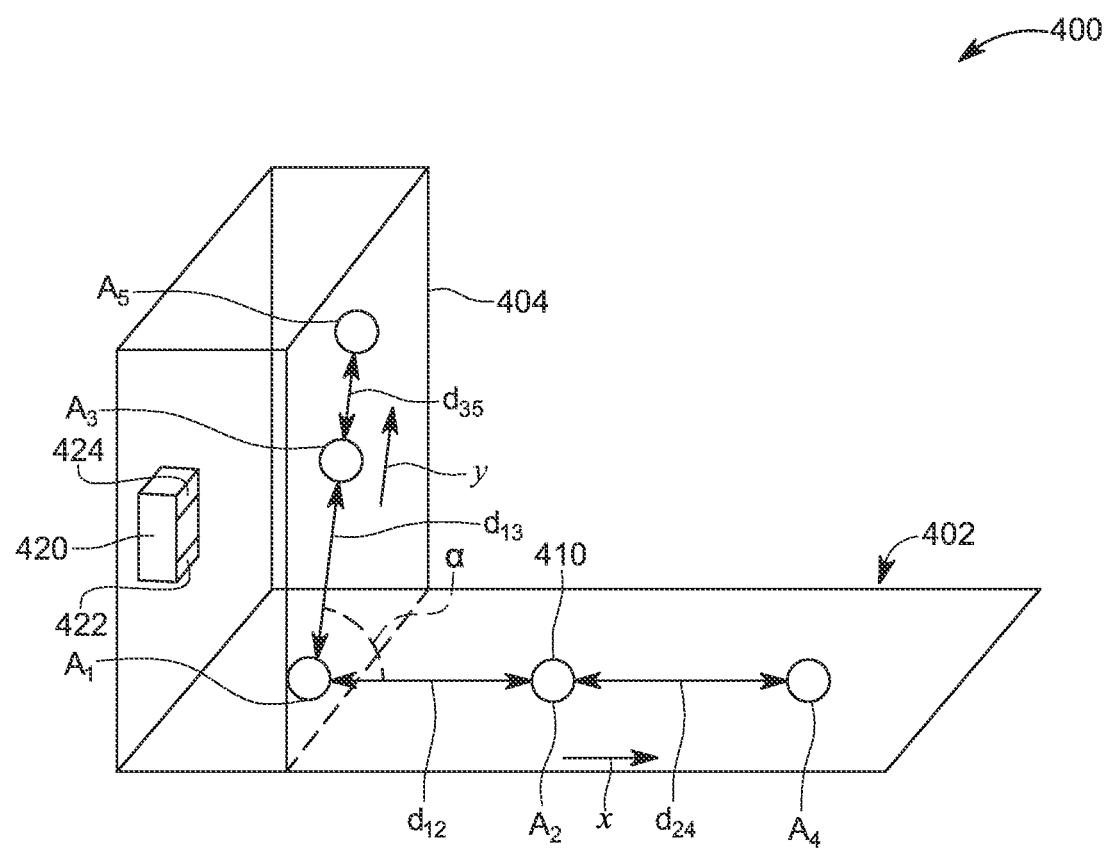
FIG. 4 illustrates a system having five antennas arranged along two different baselines and using a single frequency for determining an attitude of the system.
Figure 5:
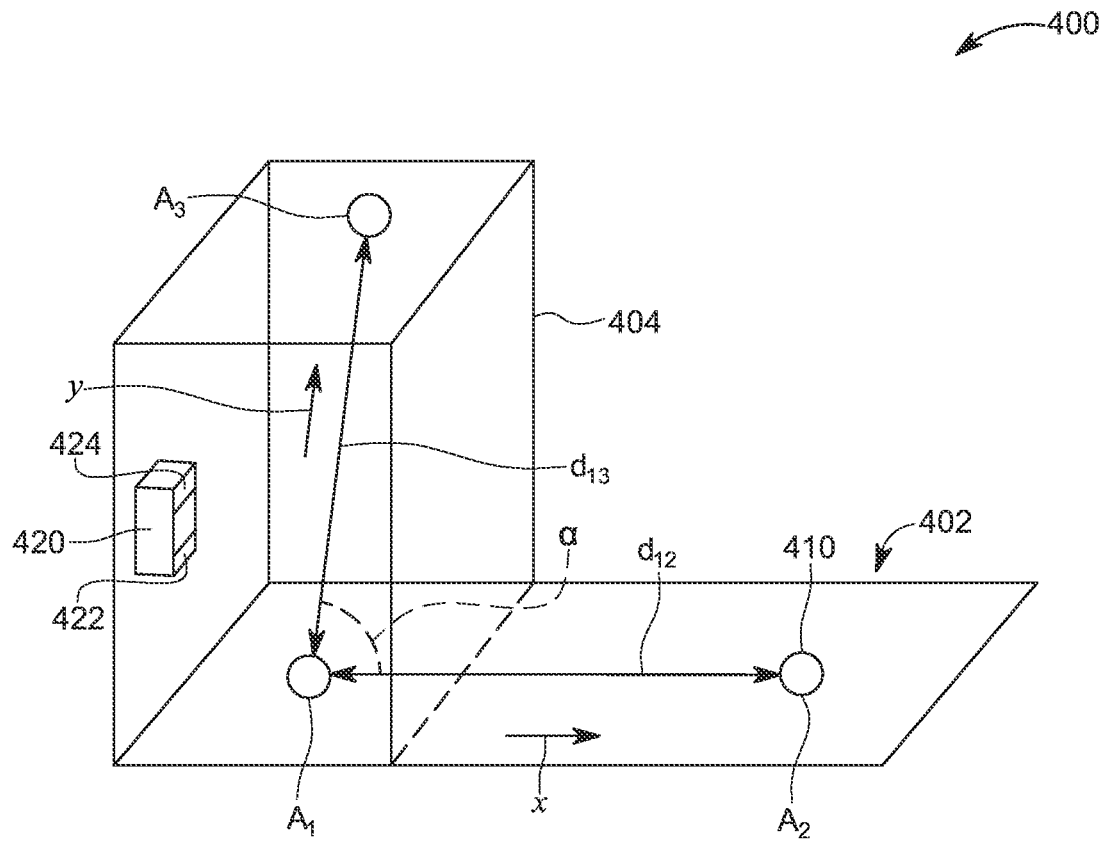
FIG. 5 illustrates a system having three antennas arranged along two different baselines and using dual frequencies for determining an attitude of the system.

The 3-D attitude of a platform 402 can be obtained by estimating two pointing directions x and y of two non-collinear and non-parallel baselines as shown in FIG. 4. Note that system 400 in FIG. 4 may have the first baseline pointing along a first pointing direction x, which extends horizontally along the vehicle, and the second baseline pointing along a second direction y, almost vertically, disposed along a compartment 404 of the system 400. One skilled in the art would understand that the first and second baselines may be positioned differently along the system 400 in FIG. 4 as long as the two baselines are non-collinear and non-parallel. When applying the first integer ambiguity resolution method (I), i.e., the method based on receiver geometrical configuration discussed above, the antenna configuration depicted in FIG. 4 can be exploited. If the second integer ambiguity resolution method (II) based on the dual frequencies is employed, then an antenna configuration as shown in FIG. 5 has to be used. Note that if more frequencies are used for the configuration of FIG. 5, then fewer antennas are necessary. Further note that system 400 may be implemented as a vehicle. System 400 may include in addition to the receivers 410, a controller 420. The controller 420 may include at least a processor 422 and a memory 424 for storing instructions. The controller 420 is in (wired or wireless) communication with each receiver 410 and is configured to implement any of the methods and algorithms discussed herein.

To obtain the 3-D attitude of the platform 402 using configurations such as those depicted in FIGS. 4 and 5, it is sufficient to estimate the pointing directions of two non-collinear baselines. Baseline pointing vectors can be estimated, for example, based on equation (1) if the integer ambiguities are known. For example, the following least square (LS) minimization can be implemented to obtain the pointing direction of the baseline between antenna A1 and antenna A2:

$$\min_{x \in \mathbb{R}^{3 \times 1}} \left\| \hat{\phi}_{12} - d_{12} H x \right\|_2^2. \quad (14)$$

This LS formulation has the following baseline direction x solution:

$$\hat{x} = \frac{1}{d_{12}} (H^T H)^{-1} H^T \hat{\phi}_{12}. \quad (15)$$

The solution of equation (15) is valid for both the five-antenna configuration of FIG. 4 and the three-antenna configuration of FIG. 5. For both configurations, the second baseline direction y can be estimated in a similar manner as in equation (15), i.e., $$\hat{y} = \frac{1}{d_{13}} (H^T H)^{-1} H^T \hat{\phi}_{13}. \quad (16)$$

However, it is possible to calculate the baseline directions x and y in a different manner, which uses the available baseline length information. A constrained least square (CLS) formulation thus can be implemented as:

$$\min_{x \in \mathbb{R}^{3 \times 1}} \left\| \hat{\phi}_{12} - d_{12} H x \right\|_2^2, \quad (17)$$
$$s.t. \, \|x\|_2^2 = 1,$$

where the symbol $\| \|_2$ denotes the second-order norm and "s.t." stands for "such that" and implies that equation (17) is calculated "such that" the norm of direction x is one. This constrained minimization problem can be solved using the Lagrange multiplier method. Given the Lagrange multiplier denoted by λ (which has nothing to do with the wavelength of the carrier), the pointing direction estimation can be accomplished by solving the minimization problem noted in equation [6], i.e., $$\min_{x \in \mathbb{R}^{3 \times 1}} \left\| \hat{\phi}_{12} - d_{12} H x \right\|_2^2 + \lambda (\|x\|_2^2 - 1). \quad (18)$$

The solution of this equation is given by:

$$\hat{x} = \frac{1}{d_{12}} (H^T H + \lambda I)^{-1} H^T \hat{\phi}_{12}, \quad (19)$$

where I is a 3×3 identify matrix and the value of the Lagrange multiplier λ is computed by using Newton's algorithm to solve equation (17). Equation (19) can be also written as:

$$(H^T H + \lambda I)x = \frac{1}{d_{12}} H^T \hat{\phi}_{12}. \qquad (20)$$

The second baseline direction y can be estimated in a similar manner based on equations (19) and (20) for a baseline length $d_{13}$, and a phase-difference vector $\hat{\phi}_{13}$. This means that the following equation needs to be solved:

$$\min_{y \in \mathbb{R}^{3 \times 1}} \|\hat{\phi}_{13} - d_{13} H y\|_2^2 + \lambda(\|y\|_2^2 - 1), \qquad (21)$$

where λ is obtained by solving the equation:

$$(H^T H + \lambda I)y = \frac{1}{d_{13}} H^T \hat{\phi}_{13}. \qquad (22)$$

The results obtained in equations (15) and (16) for the baseline directions x and y, and those obtained in equations (19) and (21), can be transformed to a 3-D attitude as known in the art. The former pair of equations corresponds to the core of the LS approach in reference [6], while the latter corresponds to the CLS approach in the same reference. The two approaches benefit from refinement steps applied after obtaining the results from the pairs of equations (15) and (16), and (19) and (21). The details of these refinement steps are omitted herein for the sake of brevity. However, it is noted that for the single frequency approach, the refinement is accomplished by re-computing each baseline direction vector over the longer baseline aligned with the pointing direction. In FIG. 4, the two baselines are connecting antenna A1 to antennas A4 and A5, respectively. For the two-frequency approach, it is possible to carry out the initial estimation using the frequency with the larger wavelength and refining these results using the second, smaller frequency.

The methods discussed above are capable of estimating the pointing directions x and y of the first and second baselines independently from each other. These methods are based on the LS and CLS approaches introduced in reference [6]. The results offered by these methods provide (somewhat) coarse estimates of the baseline directions and unwrapped phase-difference. In the following embodiments, more accurate methods are introduced for estimating the baseline directions based on the configurations in FIGS. 4 and 5. These novel methods incorporate the additional information presented by the angle between the two baseline directions x and y. In one variation, it is possible to use the estimates provided by the LS approach as seeds to the proposed new methods.

(III) 3-D Attitude Determination Using a Simile Frequency

Figure 6:
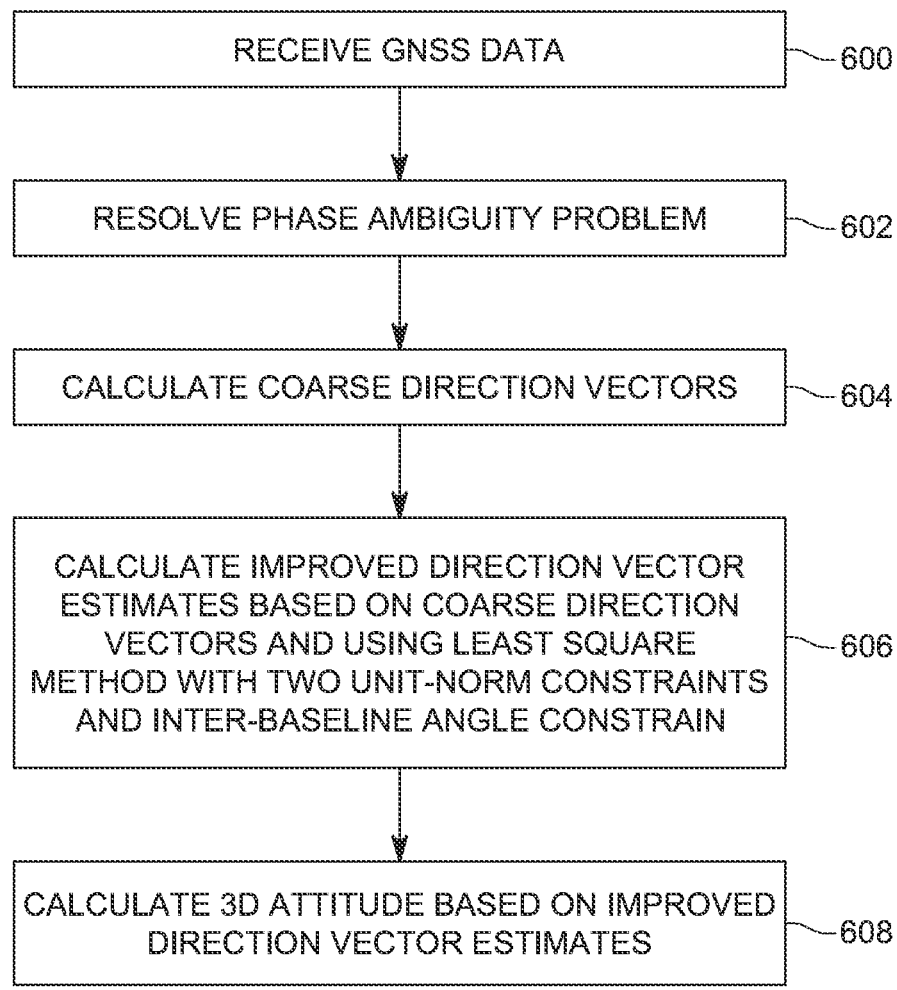
FIG. 6 is a flowchart of a method for calculating an attitude of a platform having five antennas arranged along two different antennas and using a single frequency.

In this embodiment, a novel approach, based on the Lagrange multiplier method, is proposed to improve the 3-D attitude estimation by integrating prior knowledge of the antenna geometry and baseline lengths into an objective function. The method is illustrated in FIG. 6 and starts with a step 600 of receiving GNSS data. The GNSS data can include two types of information, (1) pseudo-range data and (2) ambiguous carrier phase measurements, more precisely the ambiguous phase single-difference measurement φ. For this method, only the carrier phase measurements are necessary. Then, in step 602, the phase ambiguity problem is addressed. This step can be implemented with the 3 antenna configuration of FIG. 2 and a single frequency, as discussed above, or with the 2 antenna configuration of FIG. 3 and two different frequencies, as also discussed above. The antenna configurations shown in FIGS. 2 and 3 provide a single direction vector x associated with the corresponding baseline. However, to determine the 3-D attitude, there is a need to determine two direction vectors x and y. Thus, for this method, the phase ambiguity problem is solved using either the antenna configuration shown in FIG. 4 together with a single frequency, or the antenna configuration shown in FIG. 5 together with two frequencies. Note that prior to determining the two direction vectors x and y, the unambiguous phase single-difference estimate is calculated based on equation (4).

The integer phase ambiguity may be solved using the model illustrated above in method (I), or the model illustrated above in method (II). In other words, equations (2) to (7) or equations (8) to (13) may be used to solve the integer phase ambiguity. After solving the integer phase ambiguity in step 602, the coarse values of the direction vector estimates $x_{cor}$ and $y_{cor}$ are found in step 604, using the methods discussed in Section "Coarse Direction Vector Determination," for example, equations (15) and (16) or (19) and (21). However, these vector estimates may not be as accurate as desired.

Thus, in step 606, improved direction vector estimates x and y are calculated based on the coarse direction vectors $x_{cor}$ and $y_{cor}$. The direction vector estimation problem in this step can be formulated as a least square problem in terms of both the x and y directions, for the pairs of antennas A1-A4 and A1-A5, together with three constraints, one for the length (norm) of the direction vector x, one for the length (norm) of the direction vector y, and one for the inter-baseline angle, between the two baselines, which can be written as follows:

$$\min_{x, y \in \mathbb{R}^{3 \times 1}} \|\phi_{14} - d_{14} H x\|_2^2 + \|\phi_{15} - d_{15} H y\|_2^2 \qquad (23)$$

$$s.t. \|x\|_2^2 = 1,$$

$$\|y\|_2^2 = 1, \text{ and}$$

$$\langle x \mid y \rangle = \cos\theta,$$

where the symbol $\langle \mid \rangle$ denotes the vector product.

In this least square implementation, the observations across the longest baselines 14 and 15 are utilized so that the best possible accuracy of the pointing direction estimation for x and y are achieved. Note that the vectors of unambiguous phase $\phi_{14}$ and $\phi_{15}$ may be estimated based on the vectors of unambiguous phase $\phi_{12}$ and $\phi_{13}$ calculated with equations (4) and/or (11) in step 602. Despite the convexity of the objective function in equation (23), the above optimization problem is not convex due to the quadratic constraints of the lengths of the direction vectors and the angle between the direction vectors. Thus, this problem is difficult to solve and requires intensive computational capabilities to reach a solution.

To simplify the solution of this problem, according to this embodiment, the problem is reformulated to reduce the number of constraints. In the modified formulation, for the two unit-norm constraints of the direction vectors x and y in equation (23), the direction vectors x and y are expressed in the spherical coordinate system and the two direction vectors are defined to lie on the unit sphere. This automatically incorporates the unit-norm constraints and leaves the problem with a non-convex optimization problem with a single (the angle) constraint.

Applying the Lagrange multiplier method to leverage this angle constraint, results in the following minimization problem:

$$\min_{x,y \in \mathbb{R}^{3\times 1}} \|\phi_{14} - d_{14}Hx\|_2^2 + \|\phi_{15} - d_{15}Hy\|_2^2 + \lambda(x^T y - \cos\alpha), \quad (24)$$

where $$x = (\cos\varphi_1 \cos\theta_1, \cos\varphi_1 \sin\theta_1, \sin\varphi_1)^T, \quad (25)$$

$$y = (\cos\varphi_2 \cos\theta_2, \cos\varphi_2 \sin\theta_2, \sin\varphi_2)^T. \quad (26)$$

An advantage of this formulation is that it reduces the three original constraints in equation (23) to a single one, which makes the solution of the problem more tractable. The solution of equation (24) now requires only a five-dimensional search compared to a nine-dimensional search required if, instead, three Lagrange multipliers are used to incorporate the three constraints.

To solve the minimization problem of equation (24) under conditions (25) and (26), the following procedure is used. An objective function f is introduced as follows:

$$f = \|\phi_{14} - d_{14}Hx\|_2^2 + \|\phi_{15} - d_{15}Hy\|_2^2 + \lambda(x^T y - \cos\alpha), \quad (27)$$

and solutions are sought for polar coordinates $\theta_1$, $\theta_2$, $\varphi_1$, and $\varphi_2$, in addition to $\lambda$, instead of the six elements of the two direction vectors x and y, that minimize this function. Function f is not convex. To guarantee that the solution converges to a critical point of the optimization problem, i.e., a local minimum, the partial differential equations of this formulation are set to be equal to zero, i.e., $$\frac{\partial f}{\partial \theta_1} = 0, \quad (28)$$

$$\frac{\partial f}{\partial \theta_2} = 0, \quad (29)$$

$$\frac{\partial f}{\partial \varphi_1} = 0, \quad (30)$$

$$\frac{\partial f}{\partial \varphi_2} = 0, \quad (31)$$

$$\frac{\partial f}{\partial \lambda} = 0. \quad (32)$$

Equations (28) to (32) are nonlinear due to the presence of quadratic form and the trigonometric functions. However, it is necessary to solve these equations to obtain the critical point of the function. In one application, it is possible to use Newton's method to solve these nonlinear equations. To maximize the chance that the solution converges to the global minimum, the $\theta_1$, $\theta_2$, $\varphi_1$, and $\varphi_2$ are initialized using the coarse direction vector estimates of the LS procedure from [6]. As long as the carrier phase ambiguities are correctly recovered, the LS solutions will be sufficiently close to the true direction vectors x and y even though the prior information of the antenna geometry is not utilized. This is mainly due to the high accuracy of the carrier phase observables, which also has the effect of making the value of $\lambda$ tending to be close to zero, suggesting that its initial value can be set equal to zero. Once $\theta_1$, $\theta_2$, $\varphi_1$, $\varphi_2$, and $\lambda$ are obtained, it is possible to calculate the precise baseline pointing vectors x and y by using equations (25) and (26).

Then, in step 608 the 3D attitude of the platform is calculated based on the improved direction vectors x and y.

This proposed approach combines (1) the benefit of absorbing the vector norm constraints using spherical coordinates with (2) the fast convergence characteristic of the Newton's method to effectively reduce the overall computational complexity of this problem. This method computes all the unknowns simultaneously incorporating all the information about the antenna geometry and baseline lengths to achieve an accurate direction vector estimation.

(IV) 3-D Attitude Determination Using Dual Carrier Frequencies

Another way for determining the 3-D attitude of the platform 402 is now discussed. For this case, the platform 402 illustrated in FIG. 5 is used, i.e., the antenna array includes three antennas A1 to A3, located along two non-collinear and non-parallel directions x and y. However, for this situation, it is assumed that at least two different frequencies are received from each satellite.

In this embodiment, the dual frequency method can be derived in a similar way to the single frequency method discussed with regard to FIG. 6, with the direction vectors defined as in equations (25) and (26). In this case, the following constraint minimization problem needs to be solved:

$$\min_{x,y \in \mathbb{R}^{3\times 1}} \|\phi_{12} - d_{12}Hx\|_2^2 + \|\phi_{13} - d_{13}Hy\|_2^2, \quad (33)$$

$$s.t. \ \|x\|_2^2 = 1,$$

$$\|y\|_2^2 = 1, \text{ and}$$

$$\langle x \mid y \rangle = \cos\theta,$$

As mentioned before, two frequencies are used in the phase refinement stage (a first frequency having the long wavelength and then a second frequency having the short wavelength) to enhance the direction vector estimates x and y. Here, the frequency corresponding to the shortest wavelength is considered when refinement is completed so as to improve the precision of baseline direction vector estimations. For this method, it is possible to take advantage of Lagrange multiplier method and unit vectors in trigonometric function form to simplify equations (33), $$f = \|\phi_{12} - d_{12}Hx\|_2^2 + \|\phi_{13} - d_{13}Hy\|_2^2 + \lambda(x^T y - \cos\alpha), \quad (34)$$

where $$x_{imp} = (\cos\varphi_1 \cos\theta_1, \cos\varphi_1 \sin\theta_1, \sin\varphi_1)^T, \quad (35)$$

$$y_{imp} = (\cos\varphi_2 \cos\theta_2, \cos\varphi_2 \sin\theta_2, \sin\varphi_2)^T. \quad (36)$$

To solve this constraint optimization problem, the same techniques as discussed above with regard to the method of FIG. 6 may be used.

The methods (single and dual frequency 3D attitude determination) discussed above with regard to FIG. 6 have been tested and the results of these tests are now discussed. The performance of the two methods has been compared to three benchmark methods: The least squares (LS) method [6], the constraint least squares (CLS) method [6], and the LAMBDA method [1]. The LAMBDA method is the standard method for GNSS integer ambiguity resolution. It should be noted that the comparison might favor the LAMBDA method since it utilizes pseudo-range measurements in addition to carrier phase observations, while the methods (III) and (IV) proposed in this application use only carrier phase observables. Simulations were carried out based on the libraries of the visual simulation software with real GPS constellation and assumed receiver position [7]. The MATLAB version 3.0 of the LAMBDA software package was used for these calculations.

An elevation mask of 15 degrees was applied to remove the observations that are generally influenced by multi-path, cycle slips, and low signal to noise ratio. Tests were carried out over different simulation setups, including different GPS weeks, different noise levels and different number of satellites. In each simulation scenario, random Gaussian noise and random baseline pointing vectors were generated independently for each trial and each test was repeated $10^5$ times. The Gaussian noise of the carrier phase measurements had zero mean and standard deviation $\sigma_\phi$. A pseudo-range variance to phase variance ratio $$\frac{\sigma_\rho^2}{\sigma_\phi^2} = 10^4$$

was assumed.

For the Single Frequency Approach (III) (utilizing the antenna geometry for ambiguity resolution illustrated in FIG. 4 and the GPS L1 frequency), the simulations were carried out with the following values $d_{12}=d_{14}=50$ cm, $\Delta=\Delta'=8$ cm, $\alpha=90°$, $\sigma_\phi=3$ mm, and a number of satellites is m=4.

TABLE 1 lists the success rates of the proposed approach and the other three benchmark methods over different GPS weeks, while TABLE 2 shows the corresponding root mean squared error (RMSE) for each case. Despite the fact that the success rates of the LAMBDA method are marginally higher than those of the other methods, all the four methods offer satisfactory success rates for such a small number of satellites.

TABLE 1

| Date | GPS week | LS | | CLS | | LAMBDA | | Proposed Method | |
| --- | --- | --- | --- | --- | --- | --- | --- | --- | --- |
| | | x | y | x | y | x | y | x | y |
| 19 Nov. 2017 | 952 | 0.982 | 0.984 | 0.987 | 0.986 | 0.997 | 0.995 | 0.980 | 0.983 |
| 10 Dec. 2017 | 955 | 0.973 | 0.985 | 0.951 | 0.975 | 0.999 | 0.999 | 0.971 | 0.979 |
| 25 Mar. 2018 | 970 | 0.981 | 0.984 | 0.988 | 0.991 | 0.998 | 0.998 | 0.981 | 0.983 |
| 15 Apr. 2018 | 973 | 0.974 | 0.974 | 0.984 | 0.995 | 0.999 | 0.999 | 0.971 | 0.972 |
| 20 May 2018 | 978 | 0.969 | 0.975 | 0.987 | 0.985 | 0.999 | 0.999 | 0.975 | 0.975 |

From TABLE 2, it can be seen that the proposed method provides the best accuracy over all GPS weeks.

TABLE 2

| Date | GPS week | LS | | CLS | | LAMBDA | | Proposed Method | |
| --- | --- | --- | --- | --- | --- | --- | --- | --- | --- |
| | | x | y | x | y | x | y | x | y |
| 19 Nov. 2017 | 952 | 0.460 | 0.483 | 0.325 | 0.347 | 0.653 | 0.682 | 0.261 | 0.265 |
| 10 Dec. 2017 | 955 | 0.794 | 0.906 | 0.400 | 0.456 | 1.101 | 1.327 | 0.276 | 0.277 |
| 25 Mar. 2018 | 970 | 0.381 | 0.361 | 0.314 | 0.295 | 0.510 | 0.513 | 0.248 | 0.244 |
| 15 Apr. 2018 | 973 | 0.329 | 0.351 | 0.280 | 0.303 | 0.460 | 0.463 | 0.232 | 0.240 |
| 20 May 2018 | 978 | 0.289 | 0.298 | 0.269 | 0.279 | 0.410 | 0.431 | 0.231 | 0.233 |

TABLE 3 shows the deviation of the angle between the two estimated baseline directions x and y from the true angle $\alpha$. TABLE 3 indicates that, for the proposed method, the baseline angle constraint is satisfied in all cases.

| Date | GPS week | LS | CLS | LAMBDA | Proposed Method |
| --- | --- | --- | --- | --- | --- |
| 19 Nov. 2017 | 952 | 0.445 | 0.310 | 0.106 | 0 |
| 10 Dec. 2017 | 955 | 0.787 | 0.426 | 0.201 | 0 |
| 25 Mar. 2018 | 970 | 0.347 | 0.265 | 0.084 | 0 |
| 15 Apr. 2018 | 973 | 0.290 | 0.265 | 0.074 | 0 |
| 20 May 2018 | 978 | 0.269 | 0.248 | 0.066 | 0 |

For the Dual-Frequency Approach (IV) (utilizing the antenna geometry for ambiguity resolution illustrated in FIG. 4 and GPS observations for both the L1 and L2 frequencies), the following parameters were used: $d_{12}=d_{13}=40$ cm, $\alpha=90°$, $\sigma_\phi=3$ mm, and the number of satellites is m=4. According to equation (8), the critical baseline length is 43.1 cm for these two frequencies. TABLE 4 presents the success rates of the dual-frequency proposed method and the LS, CLS and LAMBDA methods over different GPS weeks.

TABLE 4

| Date | GPS week | LS | | CLS | | LAMBDA | | Proposed Method | |
|---|---|---|---|---|---|---|---|---|---|
| | | x | y | x | y | x | y | x | y |
| 19 Nov. 2017 | 952 | 0.989 | 0.992 | 0.984 | 0.988 | 0.999 | 0.999 | 0.986 | 0.989 |
| 10 Dec. 2017 | 955 | 0.990 | 0.984 | 0.960 | 0.965 | 0.999 | 0.999 | 0.983 | 0.979 |
| 25 Mar. 2018 | 970 | 0.994 | 0.994 | 0.991 | 0.991 | 0.999 | 0.999 | 0.991 | 0.990 |
| 15 Apr. 2018 | 973 | 0.984 | 0.986 | 0.984 | 0.986 | 0.999 | 0.999 | 0.975 | 0.977 |
| 20 May 2018 | 978 | 0.989 | 0.984 | 0.989 | 0.984 | 0.999 | 0.999 | 0.988 | 0.983 |

TABLE 5 shows that for the dual-frequency case, the proposed method provides the highest pointing direction accuracy in all GPS weeks.

TABLE 5

| Date | GPS week | LS | | CLS | | LAMBDA | | Proposed Method | |
|---|---|---|---|---|---|---|---|---|---|
| | | x | y | x | y | x | y | x | y |
| 19 Nov. 2017 | 952 | 1.452 | 1.516 | 0.885 | 0.958 | 1.256 | 1.296 | 0.694 | 0.708 |
| 10 Dec. 2017 | 955 | 5.593 | 5.535 | 1.051 | 1.275 | 2.207 | 2.457 | 0.746 | 0.748 |
| 25 Mar. 2018 | 970 | 1.189 | 1.076 | 0.840 | 0.797 | 1.012 | 1.016 | 0.637 | 0.639 |
| 15 Apr. 2018 | 973 | 0.901 | 0.935 | 0.769 | 0.819 | 0.941 | 0.925 | 0.635 | 0.625 |
| 20 May 2018 | 978 | 0.795 | 0.805 | 0.743 | 0.752 | 0.820 | 0.830 | 0.657 | 0.640 |

TABLE 6 asserts that the proposed approach exhibits the highest level of compliance with the baseline angle constraint in all cases.

TABLE 6

| Date | GPS week | LS | CLS | LAMBDA | Proposed Method |
|---|---|---|---|---|---|
| 19 Nov. 2017 | 952 | 1.237 | 0.866 | 0.001 | 0 |
| 10 Dec. 2017 | 955 | 2.441 | 1.175 | 0.001 | 0 |
| 25 Mar. 2018 | 970 | 0.918 | 0.749 | 0.001 | 0 |
| 15 Apr. 2018 | 973 | 0.841 | 0.743 | 0.001 | 0 |
| 20 May 2018 | 978 | 0.729 | 0.673 | 0.001 | 0 |

The single-frequency and dual-frequency methods (III) and (IV) discussed above solve the ambiguity resolution first and then determine the 3-D attitude by exploiting certain actual relationships between the relative antenna positions, or the GNSS frequencies in use. By incorporating this additional information, the ambiguity resolution problem can be solved in a closed-form expression that is easy to compute. Refining methods were also proposed to improve the accuracy of the initial results. The proposed methods are capable of effectively handling the instantaneous attitude determination with a high level of accuracy. The proposed methods are also robust because they are capable of providing accurate attitude results in challenging conditions such as scenarios with low number of visible satellites.

The previous two methods (III) and (IV) relied on solving the ambiguity resolution problem to obtain coarse estimates of the unwrapped phase differences and then the direction vectors. The next method (V) solves simultaneously the ambiguity problem of the phase and the direction vectors. According to the new method (V), it searches directly for the pointing direction vectors x and y in the spherical coordinate domain. A first variation of this method (V) uses various conditions for the difference of the baseline lengths, which guarantees the uniqueness of the attitude solution. This method is very powerful as it relies on a single search step. To estimate x, the observation vector $\phi$ is considered to be the concatenation of the unwrapped phase observations over the $d_{12}$ and $d_{24}$ (when using the antenna configuration shown in FIG. 4). To estimate y, the observation vector $\phi$ is considered to be the concatenation of the unwrapped phase observations over the $d_{13}$ and $d_{35}$ when using the same antenna configuration. The details of the search strategy are discussed later.

Another variation of the method (V) uses two GNSS frequencies and the antenna configuration of FIG. 5. To estimate the direction vector x according to this method, the observation vector $\phi$ is considered to be the concatenation of the unwrapped phase observations of the two frequencies over $d_{12}$. To estimate the direction vector y, the observation vector cl) is considered to be the concatenation of the unwrapped phase observations of the two frequencies over $d_{13}$. The method (V) is now discussed in more detail.

For the single-frequency variation of the method (V), it is assumed that all the phases and distances are measured in the units of the wavelength and M+1 satellites are tracked. The configuration of the GNSS antenna/receivers is as depicted in FIG. 4. Here, the double-difference model is utilized. The double-difference corresponds to the difference of single-difference observables between satellites. The dominating function of the double-difference model is to eliminate the receiver clock bias that could cause substantial errors. In this embodiment, the double difference model is used due to its advantage in reducing the various errors.

Figure 7:
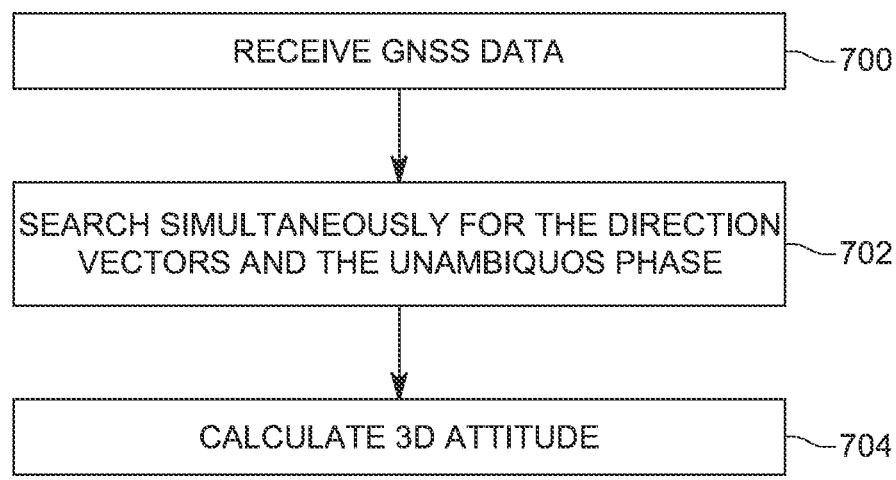
FIG. 7 is a flowchart of a method for calculating an attitude of a platform having three antennas arranged along two different baselines and using dual-frequencies.

The method (V) is illustrated in FIG. 7 and starts in step 700 in which GNSS observations are received. The GNSS observations or measurements or data include the pseudo-range and carrier phase measurements from one or more frequencies. The carrier phase observables are some orders of magnitude more precise than the pseudo-range data.

However, carrier phase measurements are ambiguous by an unknown integer numbers of cycles or wavelengths. Consequently, carrier phase integer ambiguity resolution is a prime difficulty to precise attitude determination. As previously discussed, the methods (III) and (IV) illustrated in FIG. 6 resolve first the phase integer ambiguity resolution and then calculate the 3D attitude.

In this embodiment, the novel GNSS attitude determination method (V) is discussed based on a proposed constrained wrapped least squares (C-WLS) optimality principle. The method incorporates the baseline information and ambiguity integer characteristics into the optimization model and searches for the attitude solution over the range of the yaw and pitch angles. Instead of performing integer ambiguity resolution and attitude estimation in two separate steps, as in the methods (III) and (IV) of FIG. 6, the present method (V) uses the ambiguous carrier phase directly and simultaneously estimates the attitude and integer ambiguities.

The double-difference pseudo-range and carrier phase information received from a satellite are described as:

$$\rho = dHx + \varepsilon, \text{ and} \quad (37)$$

$$\phi = \psi + N = dHx + \xi, \quad (38)$$

where $\rho \in \mathbb{R}^{M \times 1}$ is the vector of double-difference pseudo-range observables, $\phi \in \mathbb{R}^{M \times 1}$ is the vector of true (unambiguous) double-difference phases, $\psi \in \mathbb{R}^{M \times 1}$ is the vector of ambiguous double-difference phases, $N \in \mathbb{Z}^{M \times 1}$ is the unknown integer ambiguity vector, H is an M×3 matrix with row i being the difference of the line-of-sight unit vector of satellite i and the reference satellite M+1, d is the baseline length, and $\varepsilon, \xi \in \mathbb{R}^{M \times 1}$ are the unmodeled noise. In this embodiment, $\varepsilon$ is much larger than $\xi$ and $\rho$ and $\psi$ are measured while $\phi$ needs to be calculated.

To estimate the pointing direction of the direction vector x with high accuracy, traditionally, it is first necessary to resolve the integer ambiguities. Once the integer ambiguities are correctly recovered, the baseline pointing vector can be acquired using the following constraint minimization model:

$$\min_{x \in \mathbb{R}^{3 \times 1}} \|\phi - dHx\|_{Q_\phi}^2, \quad (39)$$

$$\text{s.t.} \|x\|_2^2 = 1,$$

where $\|\cdot\|_{Q_\phi}^2 = (\cdot)^T Q_\phi^{-1}(\cdot)$, and $Q_\phi$ is the variance-covariance matrix of the double-difference carrier phase observations.

To avoid the complex process of resolving the carrier phase integer ambiguities, the method (V) uses in step 702 a novel optimization model that simultaneously and jointly estimates the direction vectors x and y and recovers the ambiguous phase. Given the high accuracy of carrier phase measurements, it is reasonable to assume that the phase noise for the double-difference model lies in the range of $$\left[-\frac{1}{2}, \frac{1}{2}\right].$$

Given the integer characteristics of the unknown carrier phase ambiguities, the following constraint optimization model can be used to estimate the baseline direction from double-difference observations:

$$\min_{x \in \mathbb{R}^{3 \times 1}} \|\text{wrap}(\psi - dHx)\|_{Q_\phi}^2, \quad (40)$$

$$\text{s.t.} \|x\|_2^2 = 1,$$

where the 'wrap' operation removes the integer part of the phase double difference to restrict its output to the interval $$\left[-\frac{1}{2}, \frac{1}{2}\right].$$

The model described by equation (40) is named as the constrained wrapped least squares (C-WLS) method as this model is a non-convex optimization by virtue of the non-linearity of the wrap function and the quadratic constraint. Thus, a unique global optimization point of equation (40) cannot be guaranteed. Although there is a slight possibility that the model would convergence to a wrong solution for a short baseline and sufficient satellites, it is possible to utilize the pseudo-range measurements to avoid that case by using the following equation:

$$\min_{x \in \mathbb{R}^{3 \times 1}} \left\| \begin{array}{c} \text{wrap}(\psi - dHx) \\ \rho - dHx \end{array} \right\|_Q^2, \quad (41)$$

$$\text{s.t.} \|x\|_2^2 = 1,$$

where Q is the joint variance-covariance matrix of double-difference carrier phase and pseudo-range observations.

It can be seen that when using the C-WLS form as the cost function, there is a non-linear operation. The solution to equation (41) cannot be expressed mathematically in a simple way. In order to solve this nonlinear minimization problem, it is proposed in this embodiment a grid search solution by replacing the baseline constraint with $$x = \begin{bmatrix} \cos\alpha\cos\beta \\ \cos\alpha\sin\beta \\ \sin\beta \end{bmatrix}, \quad (42)$$

where $\alpha$ and $\beta$ are the attitude angles yaw and pitch respectively, with angle $\alpha$ belonging to the interval $[-\pi, \pi]$, and angle $\beta$ belonging to the interval $$\left[-\frac{\pi}{2}, \frac{\pi}{2}\right].$$

The direction vector x can be estimated by searching over the range of $\alpha$ and $\beta$. The 'wrap' operation tackles the phase ambiguities as integer values in an implicit way. The direction vector x represented in form (42) guarantees that the solution is of unit norm. As long as the search steps are small enough, this embodiment obtains a solution guaranteeing that integer characteristics of phase ambiguities and baseline length are rigorously respected.

The advantage of this method is that it directly integrates the a priori knowledge of phase ambiguities and baseline length into the optimization model. This model transforms both the complicated integer ambiguity resolution and constraint optimization problem to a simpler search. The proposed approach is resistant to cycle slip due to applying only the fraction part of the carrier phase. Besides, the true double-difference phase uniquely corresponds to the resulting pointing vector, that is, this method can simultaneously estimate the unwrapping double-differenced phase and the baseline pointing vector. This is different from most of the existing methods which resolve the unknown integer ambiguities firstly and then estimates the pointing vector.

The search strategy used for step 702 is now discussed. The search is simplified for this method because there is no constraint to be considered and a correct solution can be expected if the search step is infinitesimal. However, the small search step could lead to intensive computational requirements and thus, this process will be very time-consuming. In order to enhance the efficiency of the method, the search is carried out through two steps: coarse search and refinement.

For the coarse search, a search step $\Delta$ is defined. Because angle $\alpha$ belongs to the interval $[-\pi, \pi]$ and angle $\beta$ belongs to the interval $$[-\frac{\pi}{2}, \frac{\pi}{2}],$$

there are approximately $$n = \left\lfloor \frac{\pi}{\Delta} \times \frac{2\pi}{\Delta} \right\rfloor$$

estimation candidates for x, where $\lfloor \cdot \rfloor$ represents the rounding operation. All these n candidates are evenly distributed within a 2-D grid space. The estimated candidate x, which minimizes the objective function (40) or (41) is used as the coarse solution, $$\hat{x} = \begin{bmatrix} \cos\hat{\alpha}\cos\hat{\beta} \\ \cos\hat{\alpha}\sin\hat{\beta} \\ \sin\hat{\beta} \end{bmatrix}. \tag{43}$$

The search step $\Delta$ is chosen according to the baseline length d according to the equation:

$$|Hx - H\hat{x}| < \frac{1}{2d}. \tag{44}$$

Using the small angle approximation, the search step should satisfy the following criteria:

$$\Delta < \frac{1}{4d}. \tag{45}$$

For a short baseline, the search can be carried out directly. When the long baseline is used, $\Delta$ will be very small.

However, it is possible to make use of the pseudo-range measurements of the GNSS info to limit the search area. For this approach, first the method estimates the direction vector x ignoring the integer property of carrier phase ambiguities N by solving the model:

$$\min_{x \in \mathbb{R}^{3 \times 1}, N \in \mathbb{Z}^{M \times 1}} \|y - Ax - BN\|_Q^2, \tag{46}$$

$$y = \begin{bmatrix} \psi \\ \rho \end{bmatrix}, \tag{47}$$

where A and B are the designed matrices that link the data vector to the unknown parameters.

The estimation of the direction vector $\hat{x}'$ is given by:

$$\begin{bmatrix} \hat{x}' \\ \hat{n}' \end{bmatrix} = \begin{bmatrix} A^T Q^{-1} A & A^T Q^{-1} B \\ B^T Q^{-1} A & B^T Q^{-1} B \end{bmatrix}^{-1} \begin{bmatrix} A^T Q^{-1} y \\ B^T Q^{-1} y \end{bmatrix}. \tag{48}$$

The search is then carried out around within $\hat{x}'$, the search area, i.e., in the range of $\alpha$ and $\beta$ determined by the baseline length and noise level. The refinement search can be carried out around the coarse solution using a much smaller search step.

Once the refinement process is completed, the integer ambiguities and the unwrapped double-difference phases are estimated using equations:

$$\hat{N} = \lfloor dH\hat{x} - \psi \rfloor, \tag{49}$$

$$\hat{\phi} = \psi + \hat{N}. \tag{50}$$

Equations (49) and (50) can be used to transform the baseline vector between the two antennas to the yaw and pitch angles.

Finally, the method calculates in step 706, based on the calculated direction vectors x and y, the 3D attitude of the platform.

Simulations using the LAMBDA method, the C-LAMBDA method and the method discussed herein with regard to FIG. 7 showed that the present method always obtained the highest success rate, as illustrated in TABLE 7.

TABLE 7

| #SV | 4 | 5 | 6 | 7 |
|---|---|---|---|---|
| Success rate (%) | 0.14 | 3.78 | 15.96 | 41.31 |
|  | 29.03 | 56.32 | 91.90 | 98.75 |
|  | 38.95 | 64.89 | 94.19 | 99.77 |
| RMSE (deg.) | 2.77 | 1.39 | 0.89 | 0.88 |
|  | 1.10 | 0.68 | 0.64 | 0.66 |
|  | 10.9 | 0.68 | 0.65 | 0.65 |

The disclosed embodiments provide methods and systems for more accurately calculating an attitude of an object based on GNSS information. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] P. J. G. Teunissen, "The least-squares ambiguity decorrelation adjustment: a method for fast GPS integer ambiguity estimation," Journal of Geodesy, vol. 70, no. 1, pp. 65-82, November 1995.
[2] S. Purivigraipong, S. Hodgart, M. Unwin, and S. Kuntanapreeda, "Resolving integer ambiguity of GPS carrier phase difference," IEEE Transactions on Aerospace and Electronic Systems, vol. 46, no. 2, pp. 832-847, May. 2010.
[3] T. Ballal and C. J. Bleakley, "Phase-difference ambiguity resolution for a single-frequency signal," IEEE Signal Processing Letters, vol. 15, pp. 853-856, December 2008.
[4] T. Ballal and C. J. Bleakley, "Phase-difference ambiguity resolution for a single-frequency signal in the near-field using a receiver triplet," IEEE Transactions on Signal Processing, vol. 58, no. 11, pp. 5920-5926, August 2010.
[5] Tang Ballal, and C. J. Bleakley, "DOA estimation for a multi-frequency signal using widely-spaced sensors," Proceedings of the 18th European Signal Processing Conference (EUSIPCO2010), 23-27 Aug. 2010, Aalborg, Denmark, pp. 691-695.
[6] T. Ballal and C. J. Bleakley, "GNSS instantaneous ambiguity resolution and attitude determination exploiting the receiver antenna configuration," IEEE Transactions on Aerospace and Electronic Systems, vol. 50, no. 3, pp. 2061-2069, July 2014.
[7] P. J. Buist, P. J. G. Teunissen, G. Giorgi, and S. Verhagen, "Multiplatform instantaneous GNSS ambiguity resolution for triple- and quadruple-antenna configurations with constraints," International Journal of Navigation and Observation, vol. 2009, 2009.

What is claimed is:

1. A method for determining a 3-dimensional (3D) attitude of a platform, the method comprising:
   receiving satellite relayed information regarding an ambiguous phase single-difference measurement ($\varphi$);
   resolving a phase ambiguity of the ambiguous phase single-difference measurement ($\varphi$) to determine an unambiguous phase single-difference estimate ($\phi$);
   calculating coarse direction vectors $x_{cor}$ and $y_{cor}$ based on the unambiguous phase single-difference estimate ($\phi$);
   estimating improved direction vectors x and y based on the coarse direction vectors $x_{cor}$ and $y_{cor}$ and by imposing constraints on (1) a norm of each of the improved direction vectors x and y, and (2) an angle between the improved direction vectors x and y; and
   calculating the 3D attitude of the platform from the improved direction vectors x and y,
   wherein the 3D attitude indicates an orientation of the platform relative to a reference.

2. The method of claim 1, wherein the platform has first to fifth receivers for receiving the satellite relayed information and the relayed information has a single frequency.

3. The method of claim 2, wherein the first to third receivers are arranged along a first baseline, and the first, fourth and fifth receivers are arranged along a second baseline.

4. The method of claim 3, wherein the first and second baselines are not collinear and the first and second baselines are not parallel.

5. The method of claim 4, wherein the step of calculating coarse direction vectors $x_{cor}$ and $y_{cor}$ uses the unambiguous phase single-difference estimate ($\phi$) calculated with measurements only from the first, second and fourth receivers.

6. The method of claim 5, further comprising:
   applying a Lagrange multiplier method to an objective function f that uses the unambiguous phase single-difference estimate ($\phi$) calculated with measurements from the first, third, and fifth receivers,
   wherein the objective function includes the improved direction vectors x and y.

7. The method of claim 6, wherein a norm of the direction vectors x and y is constrained to be unity and an angle between the direction vectors x and y is constrained.

8. The method of claim 7, wherein the direction vectors x and y are expressed in spherical coordinates.

9. The method of claim 1, wherein the platform has first to third receivers for receiving the satellite relayed information and there are two carriers that relay the information, having a first frequency and a second frequency.

10. The method of claim 9, wherein the first and second receivers are arranged along a first baseline, and the first and third receivers are arranged along a second baseline.

11. The method of claim 10, wherein the first and second baselines are not collinear and the first and second baselines are not parallel.

12. The method of claim 11, wherein the step of calculating coarse direction vectors $x_{cor}$ and $y_{cor}$ uses the unambiguous phase single-difference estimate ($\phi$) calculated with measurements from the first frequency only.

13. The method of claim 12, further comprising:
   applying a Lagrange multiplier method to an objective function f that uses the unambiguous phase single-difference estimate ($\phi$) calculated with measurements from the second frequency,
   wherein the objective function includes the improved direction vectors x and y, a norm of each of the direction vectors x and y is constrained to be unity, and an angle between the direction vectors x and y is constrained.

14. A system for determining a 3-dimensional (3D) attitude of a platform, the system comprising:
   plural receivers configured to receive satellite relayed information regarding an ambiguous phase single-difference measurement ($\varphi$); and
   a controller connected to the plural receivers and configured to,
   resolve a phase ambiguity of the ambiguous phase single-difference measurement ($\varphi$) to determine an unambiguous phase single-difference estimate ($\phi$);
   calculate coarse direction vectors $x_{cor}$ and $y_{cor}$ based on the unambiguous phase single-difference estimate ($\phi$);

estimate improved direction vectors x and y based on the coarse direction vectors $x_{cor}$ and $y_{cor}$ and by imposing constraints on (1) a norm of each of the improved direction vectors x and y, and (2) an angle between the improved direction vectors x and y; and calculate the 3D attitude of the platform from the improved direction vectors x and y, wherein the 3D attitude indicates an orientation of the platform relative to a reference.

15. The system of claim 14, wherein the platform has first to fifth receivers for receiving the satellite relayed information and the relayed information has a single frequency.

16. The system of claim 15, wherein the first to third receivers are arranged along a first baseline, and the first, fourth and fifth receivers are arranged along a second baseline.

17. The system of claim 16, wherein the first and second baselines are not collinear and the first and second baselines are not parallel.

18. The system of claim 14, wherein the platform has first to third receivers for receiving the satellite relayed information and there are two carriers that relay the information, having a first frequency and a second frequency.

19. The system of claim 18, wherein the first and second receivers are arranged along a first baseline, and the first and third receivers are arranged along a second baseline, and the first and second baselines are not collinear and the first and second baselines are not parallel.

20. The system of claim 19, wherein the step of calculating coarse direction vectors $x_{cor}$ and $y_{cor}$ uses the unambiguous phase single-difference estimate ($\phi$) calculated with measurements from the first frequency only.

21. A non-transitory computer readable medium including computer executable instructions, wherein the instructions, when executed by a processor, implement instructions for determining a 3-dimensional (3D) attitude of a platform, the instructions comprising:

receiving satellite relayed information regarding an ambiguous phase single-difference measurement ($\varphi$);

resolving a phase ambiguity of the ambiguous phase single-difference measurement ($\varphi$) to determine an unambiguous phase single-difference estimate ($\phi$);

calculating coarse direction vectors $x_{cor}$ and $y_{cor}$ based on the unambiguous phase single-difference estimate ($\phi$);

estimating improved direction vectors x and y based on the coarse direction vectors $x_{cor}$ and $y_{cor}$ and by imposing constraints on (1) a norm of each of the improved direction vectors x and y, and (2) an angle between the improved direction vectors x and y; and calculating the 3D attitude of the platform from the improved direction vectors x and y, wherein the 3D attitude indicates an orientation of the platform relative to a reference.

* * * * *